United States Patent
Blum

(10) Patent No.: US 6,860,739 B1
(45) Date of Patent: *Mar. 1, 2005

(54) WORLD GLOBE WITH DETAIL DISPLAY 2

(76) Inventor: Alvin S. Blum, 2350 Del Mar Pl., Fort Lauderdale, FL (US) 33301

( * ) Notice: Subject to any disclaimer, the term of this patent is extended or adjusted under 35 U.S.C. 154(b) by 0 days.

This patent is subject to a terminal disclaimer.

(21) Appl. No.: 10/867,263

(22) Filed: Jun. 14, 2004

Related U.S. Application Data

(63) Continuation-in-part of application No. 10/691,893, filed on Oct. 23, 2003, now Pat. No. 6,773,262.

(51) Int. Cl.[7] .............................................. G09B 27/08
(52) U.S. Cl. ....................... 434/131; 434/130; 434/136; 434/142; 434/146
(58) Field of Search ................................ 434/130, 131, 434/146, 136

(56) References Cited

U.S. PATENT DOCUMENTS

| | | | |
|---|---|---|---|
| 2,958,959 A | * | 11/1960 | Hubbard ..................... 434/131 |
| 4,451,874 A | | 5/1984 | Friedman |
| 4,752,228 A | * | 6/1988 | Masunaga ................... 434/131 |
| 4,790,756 A | | 12/1988 | Caldwell |
| 5,057,024 A | | 10/1991 | Sprott |
| 5,519,809 A | | 5/1996 | Husseiny |
| 6,625,086 B1 | | 9/2003 | Kim |
| 6,773,262 B1 | * | 8/2004 | Blum ......................... 434/146 |

FOREIGN PATENT DOCUMENTS

JP     2002182555 A     6/2002     ........... G09B/27/08

* cited by examiner

Primary Examiner—Derris H. Banks
Assistant Examiner—Dmitry Suhol
(74) Attorney, Agent, or Firm—Alvin S. Blum

(57) ABSTRACT

A spherical world globe with geographic features imprinted on its surface rotates on an axis through the poles. The sphere is not large enough to carry legible details of all areas. Greater details are stored in a memory such as a compact disc. An indicator on the sphere is positionable north and south or the sphere is positionable relative to a fixed indicator to position the indicator along a north/south meridian. A sensor senses the north/south position of the indicator and sends a signal to a control circuit connected to the memory. Another sensor connected to the rotation of the sphere sends an east/west signal to the control circuit. Using the two signals, the circuit finds the area corresponding to the area selected on the sphere in the memory and displays it on a display in greater detail than is visible on the sphere.

10 Claims, 6 Drawing Sheets

WORLD GLOBE WITH DETAIL DISPLAY 2

This application is a continuation in part of U.S. patent application Ser. No. 10/691,893 filed Oct. 23, 2003 now U.S. Pat. No. 6,773,262.

This invention relates to geographic displays, and more particularly to a world globe with an accessory detailed display of a selected region of the globe.

BACKGROUND OF THE INVENTION

Spherical globes that have imprinted on their surface the map of the world are well known. They are generally provided with an axle through their north and south poles. They may be mounted on a base by the axle, so that they may be rotated for viewing a selected area. U.S. Pat. No. 6,625,086 issued Sep. 23, 2003 to Kim discloses a globe with a rotation sensor on the axle. A pointer indicates a longitude position at a particular time zone on the globe. The sensor feeds the rotation information into an electronic processor and a display indicates a major city in that time zone and also displays the current time in that time zone.

Navigational aids for providing maps in vehicles and on computers have detailed maps stored on a memory such as a computer disc. The information is retrieved by inputting some location data. This enables selection of particular map information from the memory to be displayed on a computer monitor or a small monitor, such as a battery operated liquid crystal display in a vehicle.

Globes can be imprinted with a great deal of geographic information. However, unless the world globe is very large, the details are not easily read. Because a globe is spherical, it is awkward and expensive to have a large one. It is much less awkward and costly to have detailed planar maps. They may also be more easily updated. Flat and folded maps are very useful, but they lack the perspective given by the globe.

SUMMARY OF THE INVENTION

It is accordingly an object of the invention to provide a world globe with geographic features thereon that rotates on an axle through the north and south poles with the axle mounted on a base. The globe is not large enough to legibly carry all of the geographic and map information that the invention provides. Additional detailed information of a selected area of the globe is provided on a display attached to the globe either on the base or at another location. Detailed information, much more than can be imprinted even on a large globe, is stored on a memory such as, but not limited to, a compact disc. Input to the memory to select a detailed map of a particular area of the globe to be displayed on the display is provided by a longitudinal signal and a latitudinal signal. A rotary position sensor adapted to sense the rotary position of the globe on the rotational axis through the north and south poles provides an east/west longitude signal. An indicator such as a transparent pointer or reticle is provided adjacent the globe surface. Mounting means for the indicator provides for relative motion between the globe and the indicator along a north/south meridian in an arc concentric with the globe, thereby maintaining its position adjacent the globe surface. A second sensor detecting the north/south location of the indicator provides the latitude signal. The two signals enable the system to select the appropriate detailed map of that latitude and longitude from the memory and to enable it to be displayed on the display. Another feature may enable the display of a more or less magnified map if desired.

These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 1:
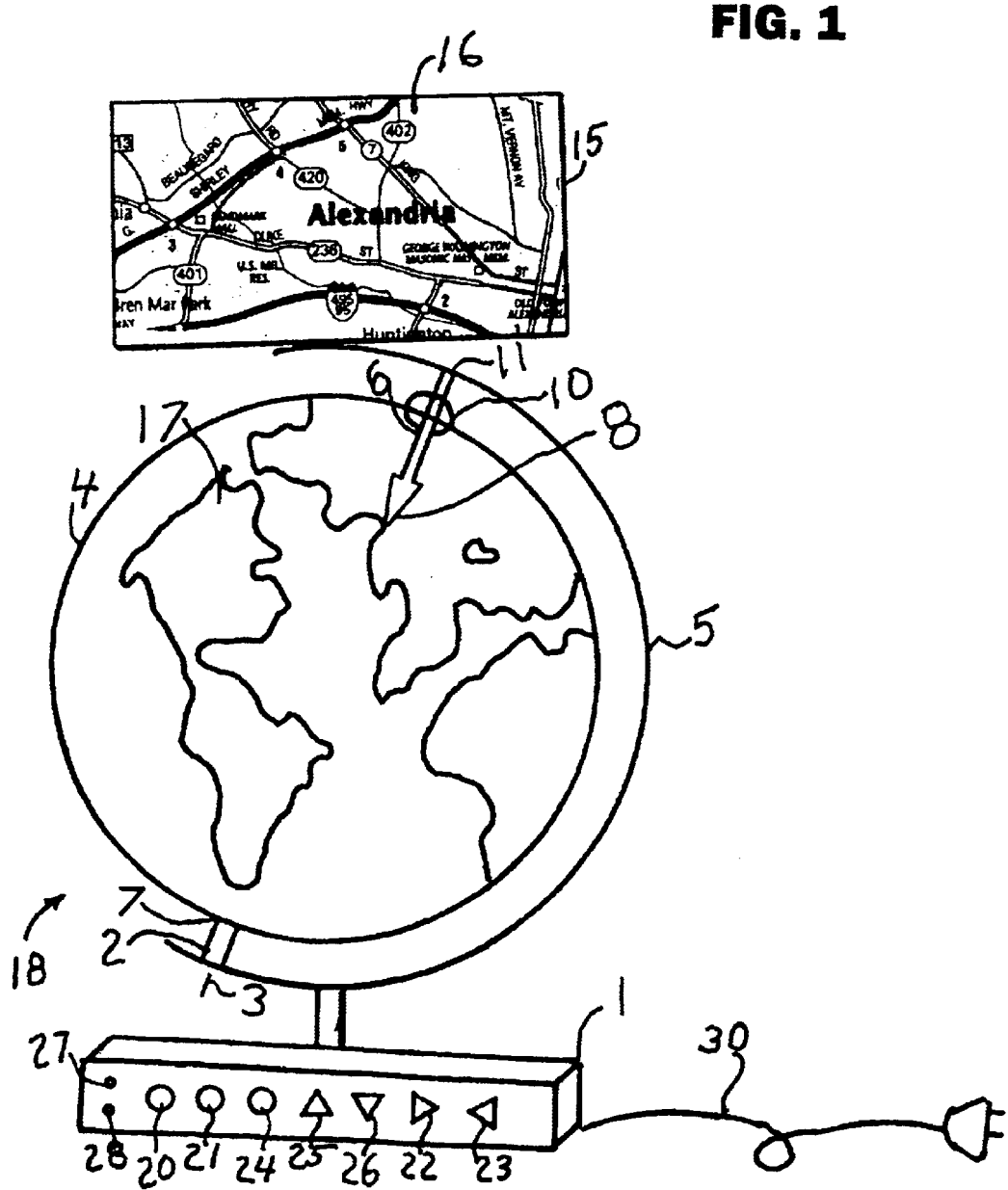
FIG. 1 is a front elevation view of the invention.
Figure 2:
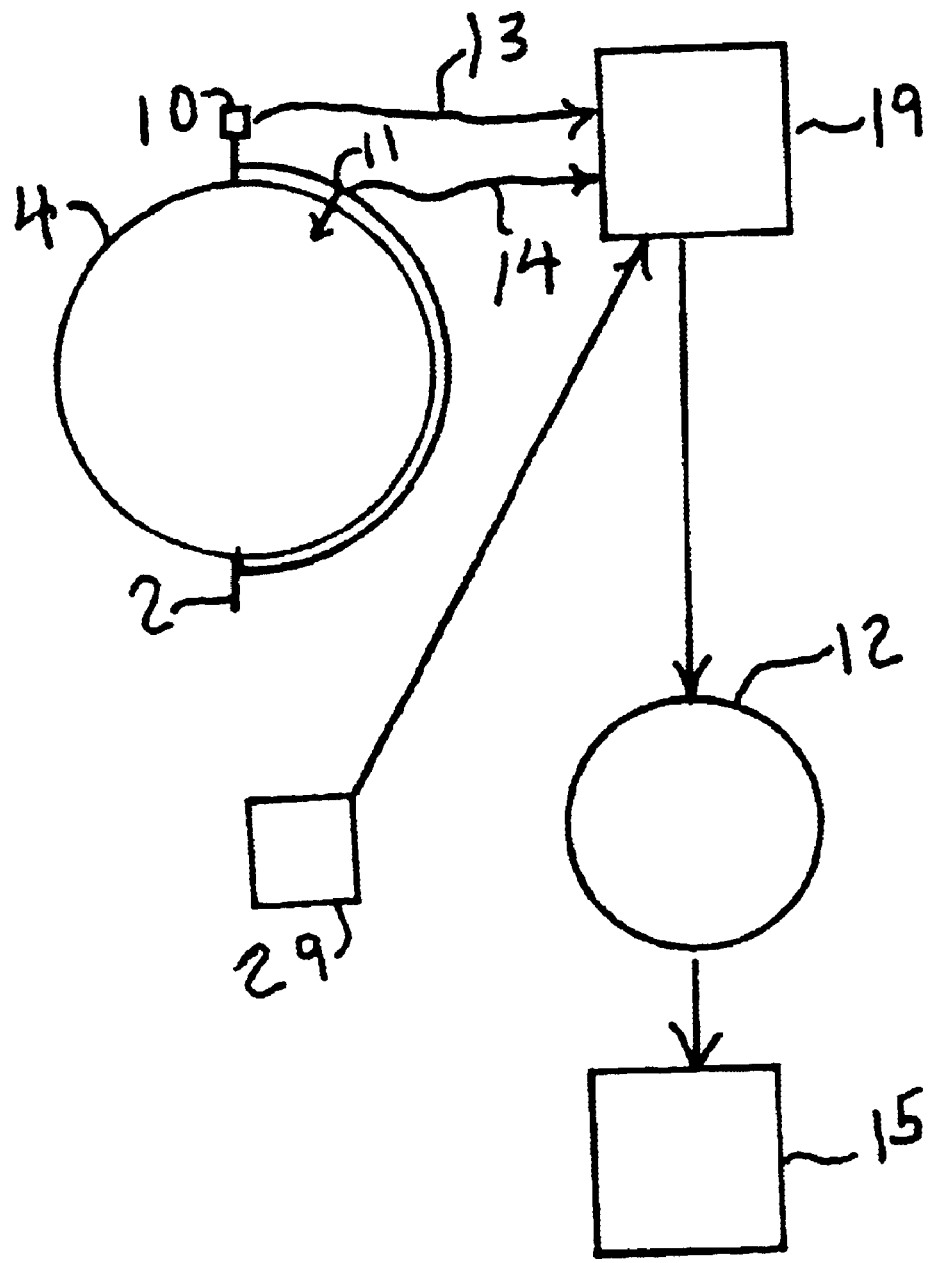
FIG. 2 is schematic representation of the invention.

Referring now to the drawing FIGS. 1–2, a globe 18 of the invention includes a sphere 4 imprinted with geographic indicia 17 representing earth on its surface. The sphere is supported on an axle element 2 that is attached to support base 1. The sphere rotates about an axis 3 through the north pole 6 and the south pole 7. A meridian member 5 extends between the two poles. An indicator 8 such as an arrow pointer is slidably mounted on the meridian member for north/south motion of the tip of the indicator on the sphere. By rotation of the sphere in the east/west direction and motion of the indicator in the north/south direction, a particular area of the earth is located. A signal 13 from a first sensor 10 sensing rotation of the sphere and therefor longitude information, and a signal 14 from the second sensor 11 sensing sliding position of the indicator and therefor latitude information of the selected area are fed to control circuit 19. Circuit 19 selects a particular portion of the memory 12 corresponding to the selected area. That detailed map information 16 is displayed on the display 15. The memory 12 may be any of the memory media well known in the art. It may be easily replaced with updated information, or with another language. Control buttons 20 and 21 select low and high magnification map displays. Button 22 moves the display to an area east, and button 23 moves the display to an area west. Button 25 moves to an area north, and button 26 moves to an area south. These functions are well known in the vehicle navigation and computer map display art. Button 24 displays the current time at the selected area. An internal clock 29 is set by positioning the indicator 8 at a location where the time is known, then entering the correct time using the hour button 27 and minute button 28. When moved to a different time zone, the system displays the time corrected to that time zone. Electric power is supplied through power cord 30.

Figure 3:
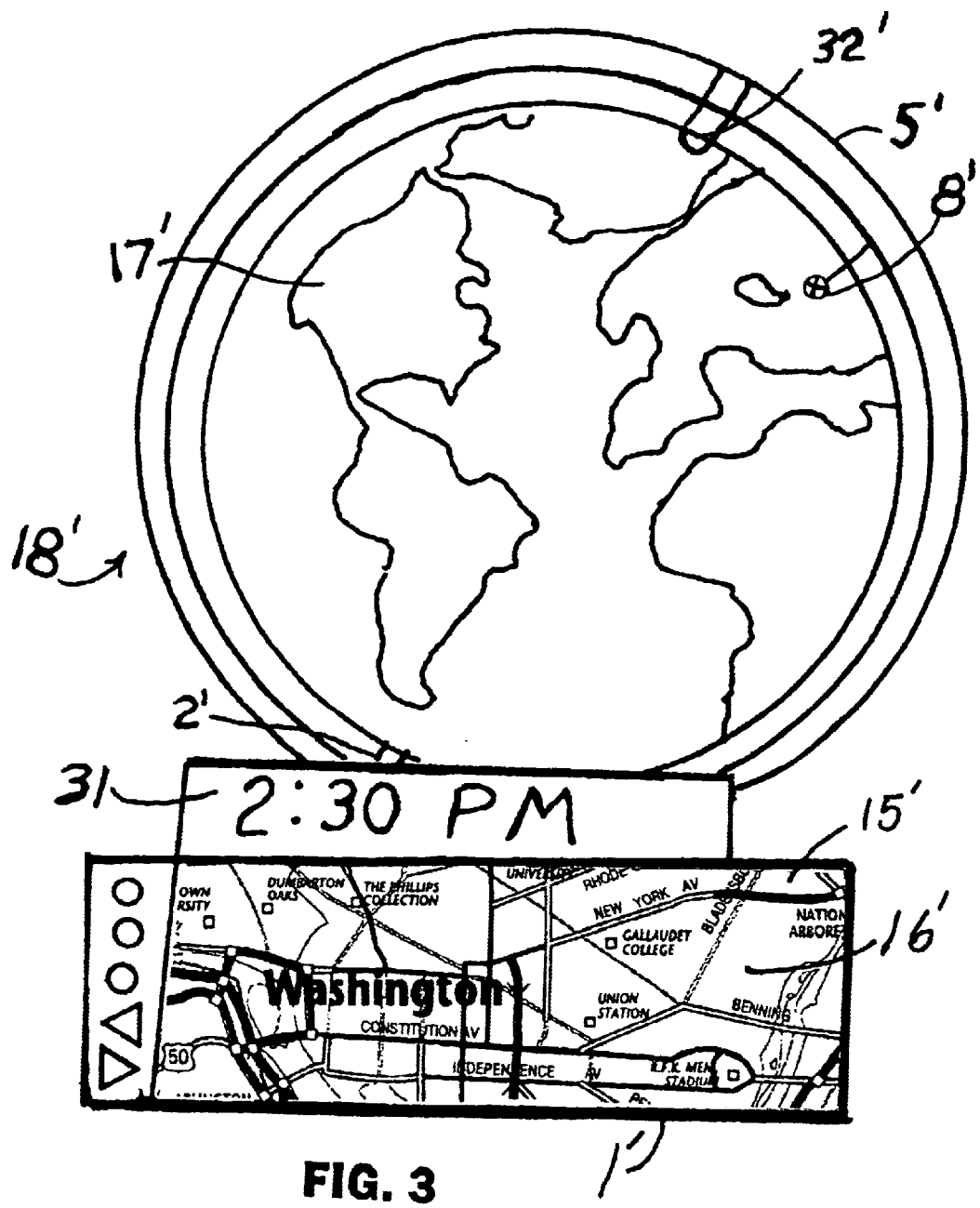
FIG. 3 is a front elevation view of another embodiment of the invention.
Figure 4:
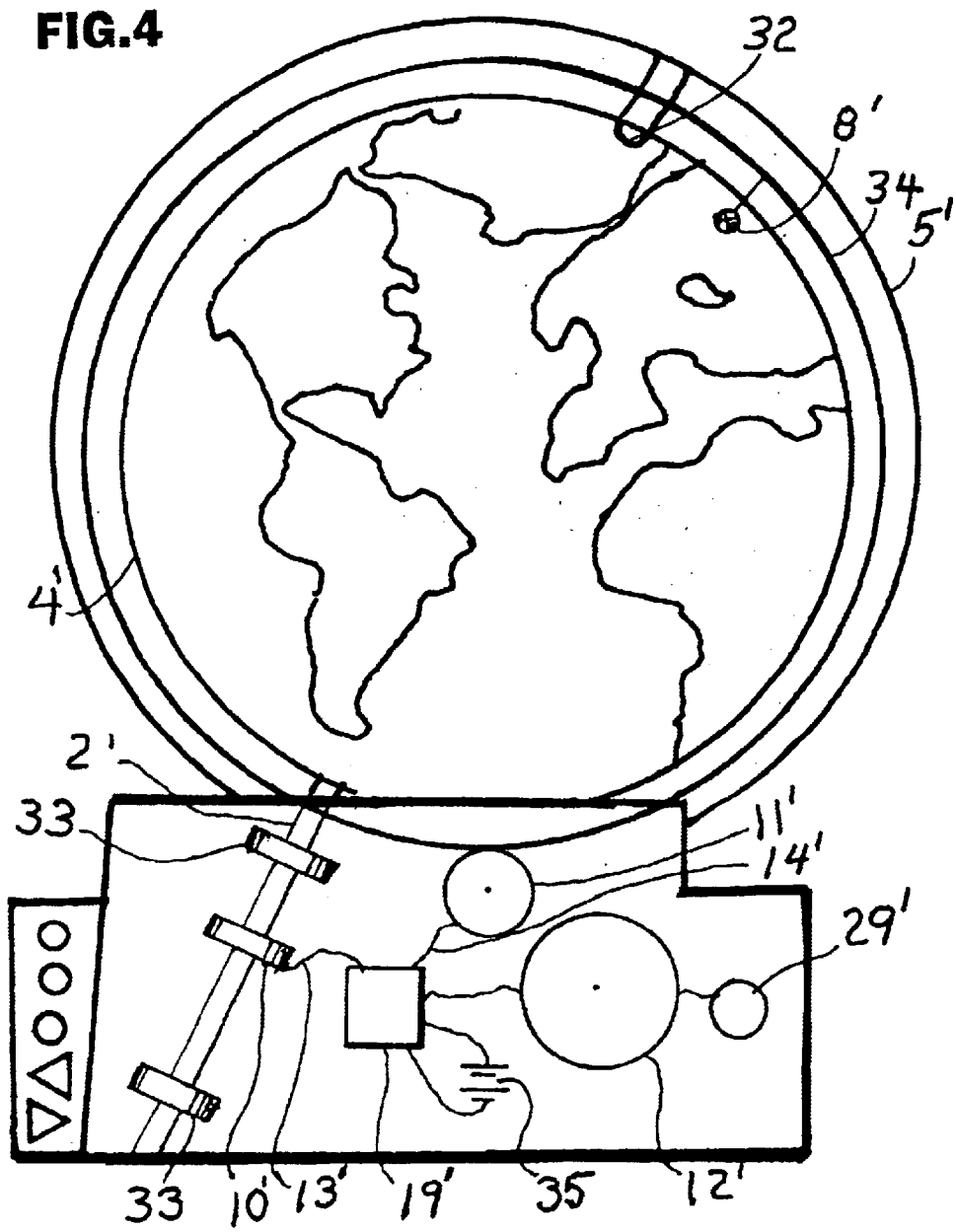
FIG. 4 is front elevation view of the embodiment of FIG. 3 with the display panel removed.

Referring now to FIGS. 3 and 4, another embodiment 18' of the invention is shown in which the display panel 15' is mounted on the base 1' to display a detailed map 16' and the time 31 at the location indicated by the cross hairs of the reticle 8'. The sphere 4' imprinted with geographic information 17' is mounted on an axle element 2' at the south pole with a pivot 32' at the north pole. The sphere and axle rotate together. The axle is rotatably supported by the two bearings 33 within the base. A rotary position first sensor 10' sends a signal through wire 13' to the computer circuit 19' indicating the longitudinal position of the reticle. A meridian member 5' encircles the sphere and supports the pivot 32. The reticle is mounted on a circular element 34 that is concentric with meridian member 5' and that slides within a track on member 5'. A second sensor 11' engages the element 34 and rotates when reticle and element 34 move, sending a signal representative of the latitude of the reticle through wire 14' to the circuit 19'. The circuit 19' selects from the memory 12' a particular detailed map 16' of the selected area for display on the display 15'. A clock circuit 29' provides time for time display 31. Electric power is provided by battery 35.

Figure 5:
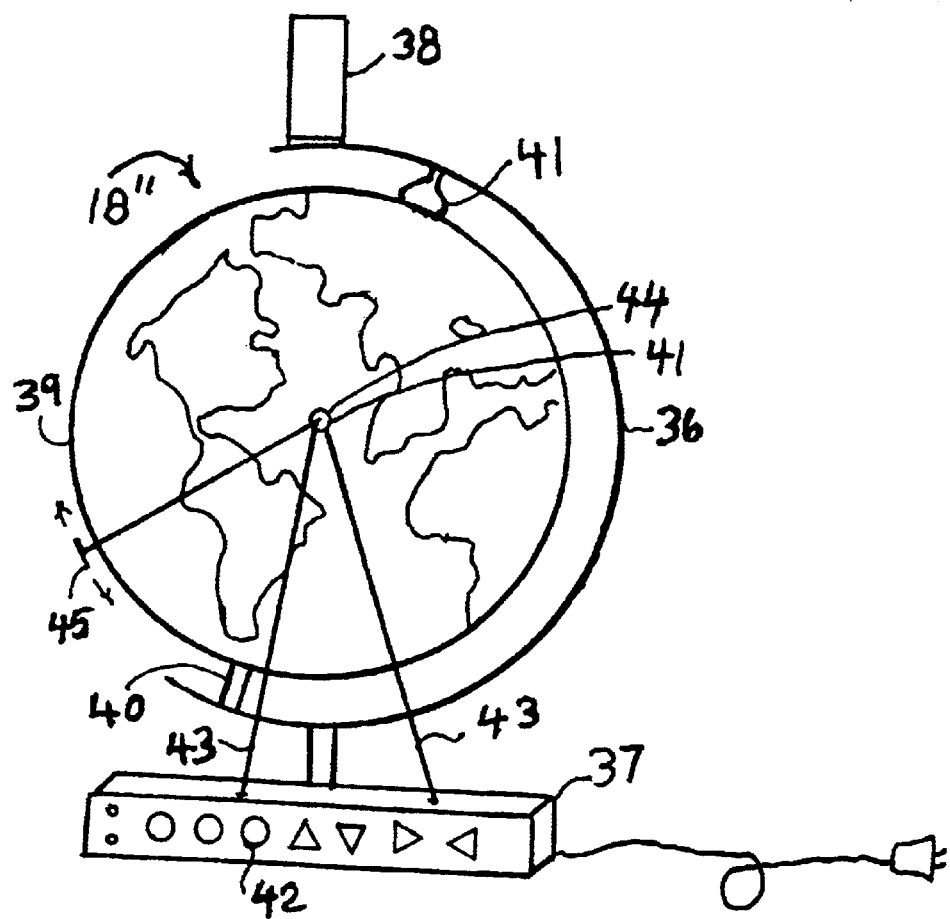
FIG. 5 is a side elevation view of another embodiment of the invention.

Referring now to FIG. 5, another embodiment 18" of the invention is shown in which an arcuate support 36 is affixed to a base 37. The display panel 38 is mounted on top of arcuate support 36. The axle 40 of globe 39 is rotatably mounted on arcuate support 36 with rotary position sensor 41 sensing longitude information supplied to the control circuit 42 in the base. Rods 43 affixed to the base support a pivot 44 positioned in line with the center of the sphere. An indicator 45 positioned at the surface of the sphere is pivotally connected to the pivot 44 so that the indicator is maintained at the sphere surface as it moves in an arc concentric with the sphere along a meridian from south to north. Rotary position sensor 41 provides a signal indicative of the latitude position of the indicator to the control circuit. The control circuit selects from the memory a detail map of the area beneath the indicator to display on the display. Alternatively, the display may not be attached to the assembly, and may take the form of a video projector, a computer, and the like (not shown).

Figure 6:
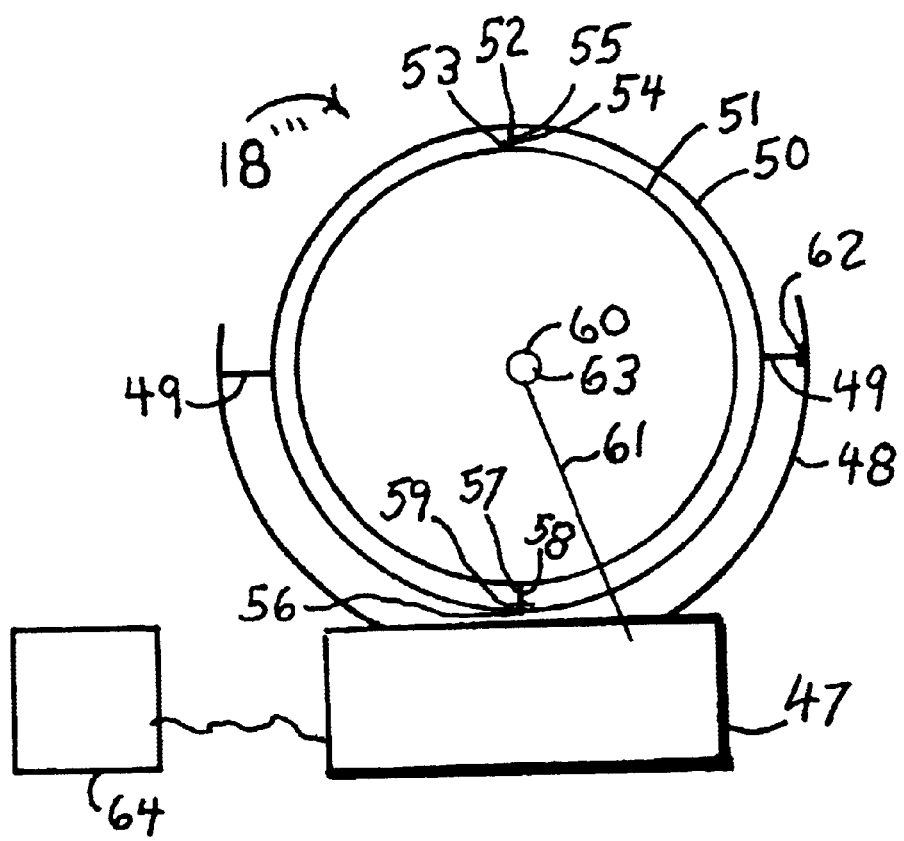
FIG. 6 is a front elevation view of another embodiment of the invention.

Referring now to FIG. 6, another embodiment 18''' of the invention is shown. Extending upward from the base 47 is a support element 48. Pivots 49 support a ring member 50 that encircles globe 51. At a first location 52 on ring member 50 a pivot 53 supports a first end 54 of the axle element, and at a second location 56 on member 50 a second pivot 57 supports a second end 58 of the axle element. The axle element may be comprised of two short aligned segments. A rotary sensor 59 provides a signal related to the rotation of the globe about its axis, longitude data. An indicator 60 in the form of a light beam from a light emitting diode 63 is focused on the globe surface. Diode 63 is affixed at the end of a rigid rod 61 extending upward from the base.
A rotary sensor 62 senses the rotary position of the ring member as the globe is moved under the indicator along a north south meridian for latitude data. The signals from the two sensors are applied as in the earlier embodiments. The display 64 may comprise a printer.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A globe assembly for displaying features of the world comprising:
   a) a base;
   b) an axle element supported by the base;
   c) a spherical globe representing the earth supported on the axle element for rotation about an axis through the north and south poles of the earth representation;
   d) an indicator positionable at the globe surface for relative positioning in a north/south direction on the globe so that, in combination with rotation on the axis, a particular location area on the globe may be selected to be at the indicator;
   e) a first sensor mounted so as to provide a longitude signal representative of the rotary position of the sphere relative to the base;
   f) a second sensor mounted so as to provide a latitude signal representative of the north/south position of the indicator relative to the globe;
   g) a memory storing more detailed map information than is displayed on the sphere; and
   h) control means operatively connecting the memory to the signals from the first and second sensors, for selecting from the memory detailed map information representing the area at the indicator.

2. The globe assembly according to claim 1 further comprising visual display means for displaying the detailed map information selected from the memory.

3. The globe assembly according to claim 2 further comprising an electronic clock and means for displaying time at the selected area.

4. The globe assembly according to claim 1 further comprising an electronic clock and means for displaying time at the selected area.

5. The globe assembly according to claim 1 further comprising:
   a) a member having a first location attached to one end of the axle element and a second location attached to another end of the axle element;
   b) at least one support element extending upward from the base;
   c) at least one pivot on the support element pivotally connected to the member so as to enable the axis of the globe to rotate about the center of the globe; and
   d) the indicator being connected to the base so that it remains at the globe surface as the globe axis is pivoted, thereby indicating latitude along a meridian.

6. The globe assembly according to claim 1 in which the indicator is pivotally supported on the base so as to remain at the globe surface and move through an arc concentric with the globe thereby indicating latitude along a meridian as it moves.

7. A method of simultaneously displaying a spherical geographic representation of the world along with a more detailed display of an area selected from the spherical geographic representation, the method comprising:
   a) providing:
      i) a base;
      ii) an axle element supported by the base;
      iii) a spherical globe representative of the earth supported on the axle element for rotation about an axis through north and south poles of the earth representation;
      iv) an indicator positionable at the globe surface for relative positioning in a north/south direction on the globe so that, in combination with rotation on the axis, a particular location area on the globe may be indicated;
      v) a first sensor mounted so as to provide a longitude signal representative of the rotary position of the sphere relative to the base;
      vi) a second sensor mounted so as to provide a latitude signal representative of the north/south position of the indicator relative to the globe;
      vii) a memory storing more detailed map information than is imprinted on the sphere; and
      viii) control means operatively connecting the memory to the signals from the first and second sensors, for selecting from the memory detailed map information representing the area indicated by the indicator;
   b) adjusting the relative position of the indicator and rotating the sphere to select a particular area of interest on the globe;

c) using the control means to select detailed map information representing the area indicated by the indicator from the memory; and d) displaying on a visual display the detailed map information representing the area indicated by the indicator.

8. The method according to claim 7 further comprising: providing;

a) a member having a first location attached to one end of the axle element, and a second location attached to another end of the axle element;

b) at least one support element extending upward from the base;

c) at least one pivot on the support element pivotally connected to the member so as to enable the axis of the globe to rotate about the center of the globe; and d) the indicator being connected to the base so that it remains at the globe surface as the globe is pivoted, thereby indicating latitude along a meridian.

9. The method according to claim 7 further comprising: providing;

the indicator being pivotally supported on the base so as to remain at the globe surface and move through an arc concentric with the globe thereby indicating latitude along a meridian as the indicator moves.

10. A globe assembly for displaying detailed features of the world comprising:

a) a base;

b) an axle element supported by the base;

c) a spherical globe representing the earth supported on the axle element for rotation about an axis through the north and south poles of the earth representation;

d) an indicator at the globe surface for relative positioning in a north/south direction on the globe so that, in combination with rotation on the axis, a particular location area on the globe may be selected to be at the indicator;

e) a first sensor mounted so as to provide a longitude signal representative of the rotary position of the sphere relative to the base;

f) a second sensor mounted so as to provide a latitude signal representative of the north/south position of the indicator relative to the globe; and g) means operatively connecting a memory to the signals from the first and second sensors, for selecting from a memory detailed map information representing the area at the indicator for graphic presentation on a display.

\* \* \* \* \*